US012724478B2

(12) United States Patent
Omata et al.

(10) Patent No.: US 12,724,478 B2
(45) Date of Patent: Sep. 1, 2026

(54) INFORMATION PROCESSING DEVICE, HEAD MOUNTED DISPLAY, AND INFORMATION PROCESSING METHOD

(71) Applicant: CANON KABUSHIKI KAISHA, Tokyo (JP)

(72) Inventors: Takeshi Omata, Kanagawa (JP); Yusuke Kazami, Kanagawa (JP); Kenya Fukabori, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/810,812

(22) Filed: Aug. 21, 2024

(65) Prior Publication Data

US 2025/0076970 A1 Mar. 6, 2025

(30) Foreign Application Priority Data

Sep. 1, 2023 (JP) ................................ 2023-142131

(51) Int. Cl.
*G06F 3/01* (2006.01)
*G06F 3/04842* (2022.01)

(52) U.S. Cl.
CPC .......... *G06F 3/012* (2013.01); *G06F 3/04842* (2013.01)

(58) Field of Classification Search
CPC ................ G06F 3/012; G06F 3/04842; G06F 2203/04806; G06F 3/011; G06F 3/017; G06F 3/04815; G06F 3/04845; G06F 3/013; G02B 27/0172; G02B 2027/0138; G02B 2027/014; G09G 3/003
See application file for complete search history.

(56) References Cited

U.S. PATENT DOCUMENTS 6,222,465 B1 * 4/2001 Kumar .................... G06F 3/017 341/20
6,972,734 B1 * 12/2005 Ohshima ................ G06F 3/012 345/157
9,122,053 B2 * 9/2015 Geisner .................. G06V 40/20
9,122,321 B2 * 9/2015 Perez .................. G06F 21/6218
9,292,085 B2 * 3/2016 Bennett ................. G06T 19/006
9,292,973 B2 * 3/2016 Bar-Zeev ........... G02B 27/0149
9,846,305 B2 12/2017 Nishizawa
(Continued)

FOREIGN PATENT DOCUMENTS

JP 2016-081339 A 5/2016
JP 2016-082466 A 5/2016
WO 2020/188655 A1 9/2020

*Primary Examiner* — Benyam Ketema
(74) *Attorney, Agent, or Firm* — Venable LLP

(57) ABSTRACT

An information processing device includes a processor; and a memory storing a program which causes the information processing device to: select a virtual object present at a line-of-sight position of a user as a control object; determine whether or not the user performed a predetermined operation for visually recognizing a rear of the control object; and execute control that the control object is moved and displayed such that the rear of the control object can be visually recognized, wherein a direction in which the control object is to be moved is determined based on at least either one of a moving direction and a rotating direction of a head part of the user, or a distance for which the control object is to be moved is determined based on at least either one of a movement amount and a rotation amount of the head part of the user.

16 Claims, 11 Drawing Sheets

(56) References Cited

U.S. PATENT DOCUMENTS 9,995,936 B1 * 6/2018 Macannuco .......... G06T 19/006
10,140,768 B2 11/2018 Takahashi
10,373,381 B2 * 8/2019 Nuernberger .......... G06F 3/011
10,406,432 B2 * 9/2019 Watanabe .......... G06F 9/453
10,429,923 B1 * 10/2019 Johnston .......... G06F 3/011
12,140,758 B2 * 11/2024 Roimi .......... G02B 27/0093
2002/0033845 A1 * 3/2002 Elber .......... G06T 17/00 715/764
2011/0107216 A1 * 5/2011 Bi .......... G06F 3/0481 715/863
2012/0056875 A1 * 3/2012 Lee .......... H04N 13/398 345/419
2012/0105473 A1 * 5/2012 Bar-Zeev .......... G06T 1/20 345/633
2014/0201666 A1 * 7/2014 Bedikian .......... G06F 3/0325 715/771
2014/0364215 A1 * 12/2014 Mikhailov .......... A63F 13/212 463/31
2015/0169176 A1 * 6/2015 Cohen .......... G06F 3/017 715/852
2015/0261291 A1 * 9/2015 Mikhailov .......... G06T 7/73 345/156
2015/0339468 A1 * 11/2015 Son .......... G06F 3/013 726/19
2015/0379770 A1 * 12/2015 Haley, Jr. .......... G09G 5/006 345/633
2016/0026242 A1 * 1/2016 Burns .......... G06F 3/04817 345/633
2016/0026253 A1 * 1/2016 Bradski .......... H04N 13/128 345/8
2016/0062514 A1 * 3/2016 Jo .......... G06F 3/04815 345/174
2016/0092080 A1 * 3/2016 Swanson .......... G06F 3/04883 345/654
2016/0109703 A1 4/2016 Nishizawa
2016/0110921 A1 4/2016 Takahashi
2016/0210780 A1 * 7/2016 Paulovich .......... G06T 3/40
2016/0214011 A1 * 7/2016 Weising .......... G09G 5/08
2016/0291329 A1 * 10/2016 Kimura .......... G06F 3/0487
2018/0136465 A1 * 5/2018 Chi .......... G06F 3/0416
2018/0150204 A1 * 5/2018 Macgillivray .......... G06F 3/04815
2018/0314326 A1 * 11/2018 Terahata .......... G06T 19/006
2019/0026589 A1 * 1/2019 Sugihara .......... G06T 19/20
2019/0057531 A1 * 2/2019 Sareen .......... A63F 13/211
2019/0139308 A1 * 5/2019 Sun .......... G06T 15/40
2019/0346678 A1 * 11/2019 Nocham .......... G06F 3/0484
2019/0362557 A1 * 11/2019 Lacey .......... G06T 5/20
2020/0117336 A1 * 4/2020 Mani .......... F25B 49/005
2020/0143554 A1 * 5/2020 Toldo .......... G06T 7/521
2021/0165484 A1 * 6/2021 Suguhara .......... G06F 3/013

* cited by examiner

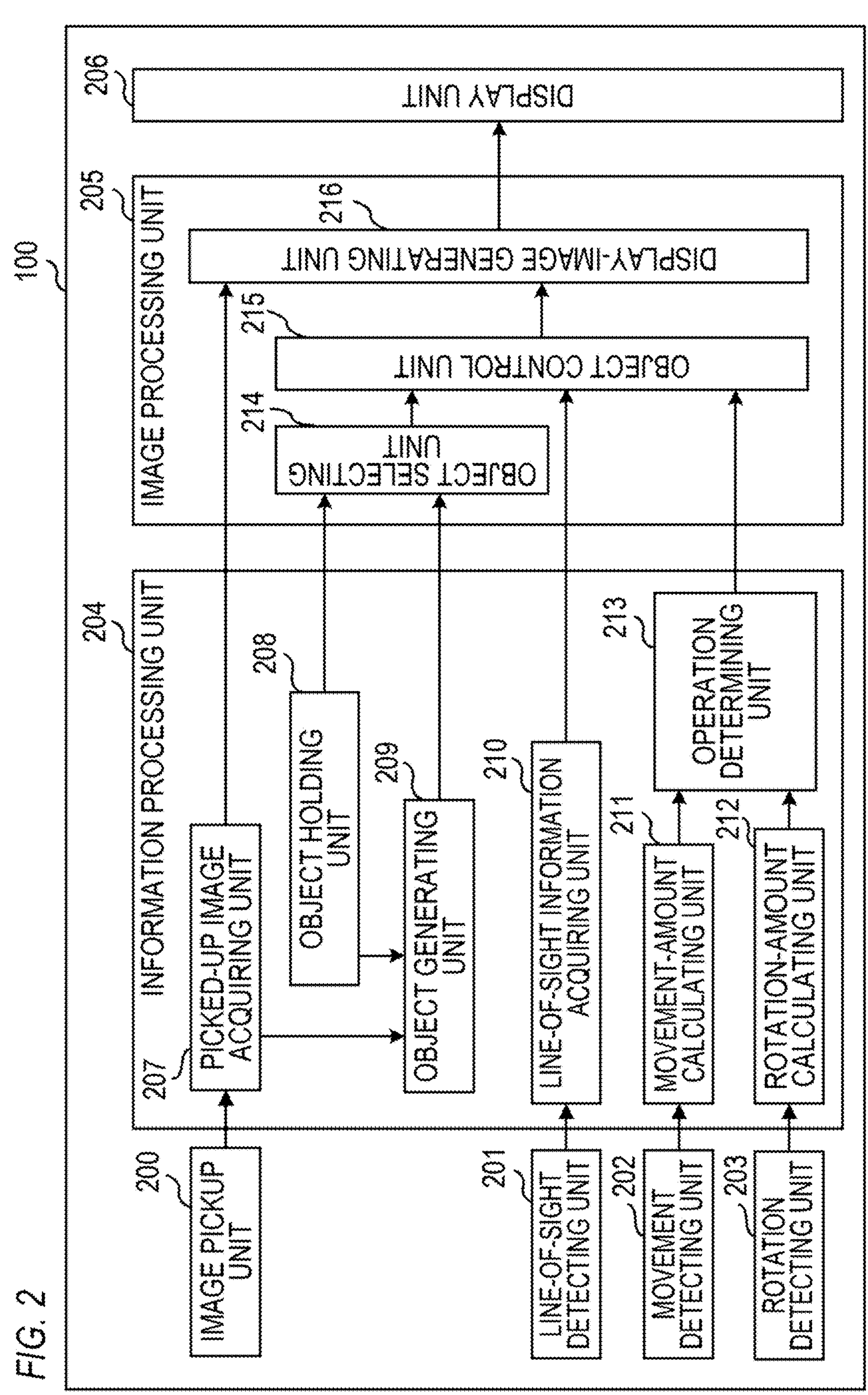
FIG. 2
100
200
IMAGE PICKUP UNIT
201
LINE-OF-SIGHT DETECTING UNIT
202
MOVEMENT DETECTING UNIT
203
ROTATION DETECTING UNIT
204
INFORMATION PROCESSING UNIT
207
PICKED-UP IMAGE ACQUIRING UNIT
208
OBJECT HOLDING UNIT
209
OBJECT GENERATING UNIT
210
LINE-OF-SIGHT INFORMATION ACQUIRING UNIT
211
MOVEMENT-AMOUNT CALCULATING UNIT
212
ROTATION-AMOUNT CALCULATING UNIT
213
OPERATION DETERMINING UNIT
205
IMAGE PROCESSING UNIT
214
OBJECT SELECTING UNIT
215
OBJECT CONTROL UNIT
216
DISPLAY-IMAGE GENERATING UNIT
206
DISPLAY UNIT

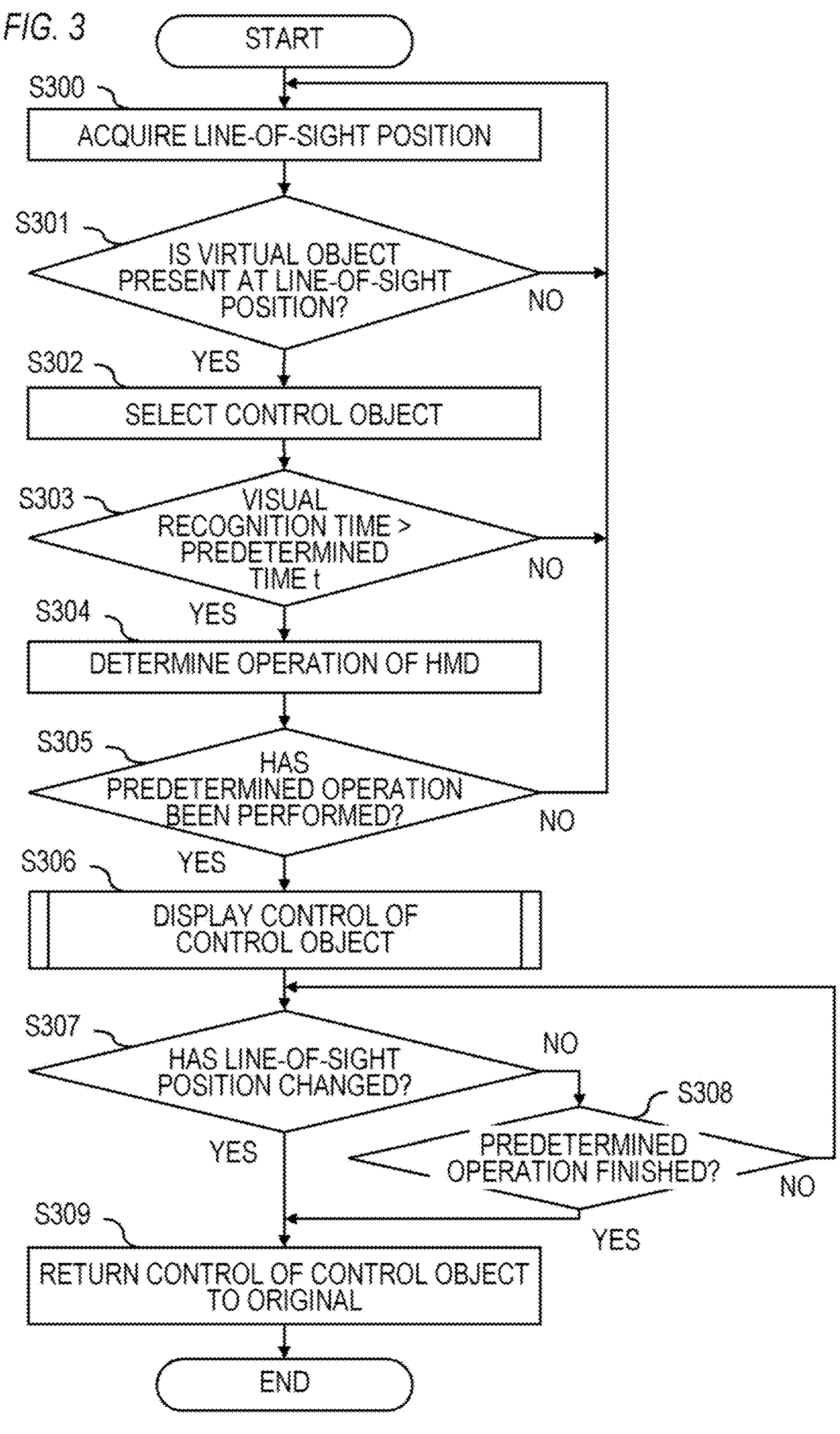
FIG. 3
START
S300
ACQUIRE LINE-OF-SIGHT POSITION
S301
IS VIRTUAL OBJECT PRESENT AT LINE-OF-SIGHT POSITION?
NO
YES
S302
SELECT CONTROL OBJECT
S303
VISUAL RECOGNITION TIME > PREDETERMINED TIME t
NO
YES
S304
DETERMINE OPERATION OF HMD
S305
HAS PREDETERMINED OPERATION BEEN PERFORMED?
NO
YES
S306
DISPLAY CONTROL OF CONTROL OBJECT
S307
HAS LINE-OF-SIGHT POSITION CHANGED?
NO
S308
PREDETERMINED OPERATION FINISHED?
NO
YES
YES
S309
RETURN CONTROL OF CONTROL OBJECT TO ORIGINAL
END

FIG. 4B

ROLL

YAW

PITCH

FIG. 4A

Y-AXIS (UP-DOWN)

X-AXIS (LEFT-RIGHT)

Z-AXIS (FRONT-REAR)

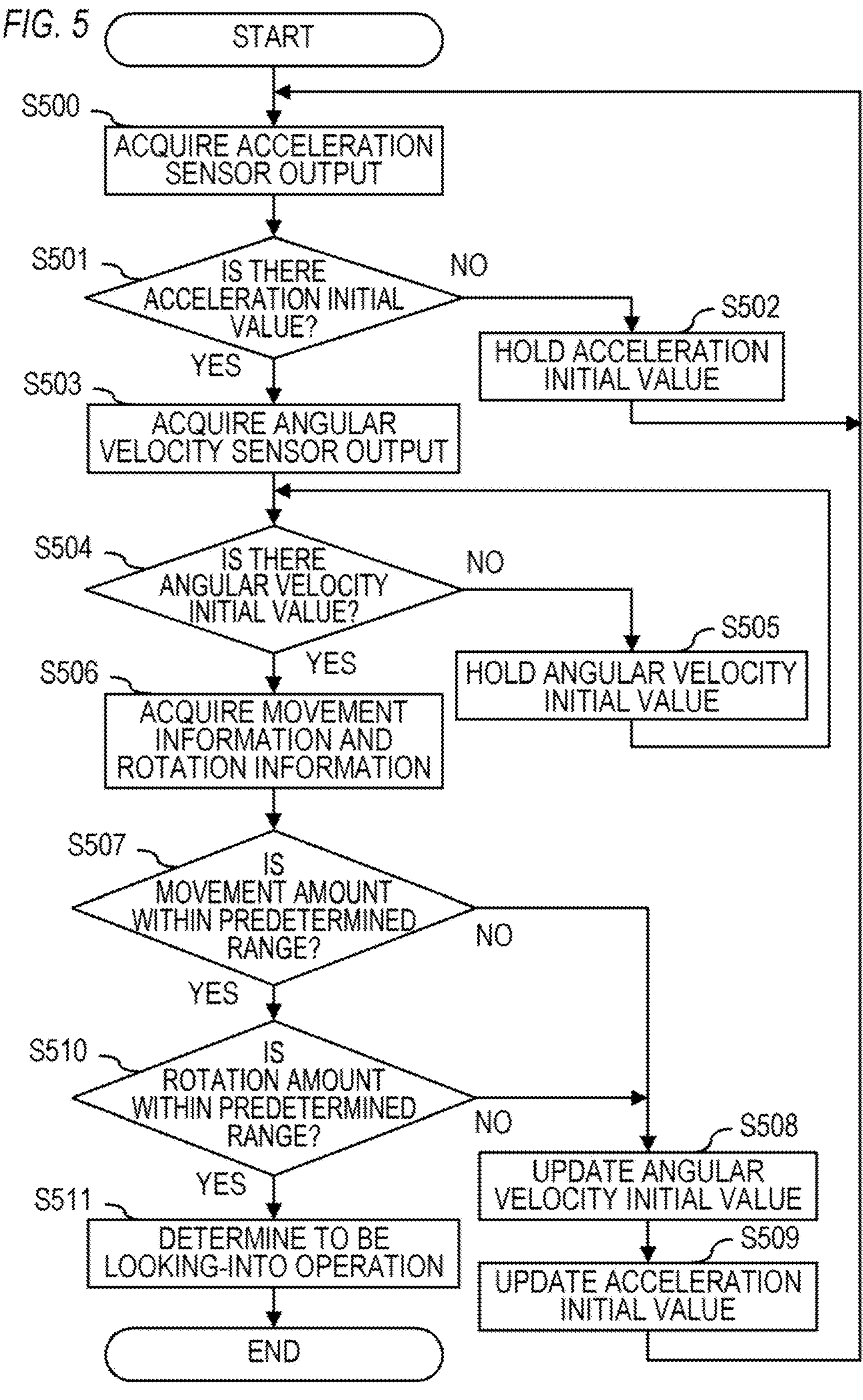
FIG. 5
START
S500
ACQUIRE ACCELERATION SENSOR OUTPUT
S501
IS THERE ACCELERATION INITIAL VALUE?
NO
S502
HOLD ACCELERATION INITIAL VALUE
YES
S503
ACQUIRE ANGULAR VELOCITY SENSOR OUTPUT
S504
IS THERE ANGULAR VELOCITY INITIAL VALUE?
NO
S505
HOLD ANGULAR VELOCITY INITIAL VALUE
YES
S506
ACQUIRE MOVEMENT INFORMATION AND ROTATION INFORMATION
S507
IS MOVEMENT AMOUNT WITHIN PREDETERMINED RANGE?
NO
YES
S510
IS ROTATION AMOUNT WITHIN PREDETERMINED RANGE?
NO
S508
UPDATE ANGULAR VELOCITY INITIAL VALUE
YES
S511
DETERMINE TO BE LOOKING-INTO OPERATION
S509
UPDATE ACCELERATION INITIAL VALUE
END

Z-AXIS
Y-AXIS
600
MOVEMENT AMOUNT A

X-AXIS
Y-AXIS
601
602
MOVEMENT AMOUNT B
MOVEMENT AMOUNT B

YAW
PITCH
603
604
ROTATION AMOUNT C
ROTATION AMOUNT C

FIG. 7

| OBJECT | DISPLAY CONTROL METHOD |
|---|---|
| DOLL | MOVEMENT |
| CAR | MOVEMENT |
| BUILDING | TRANSPARENCY |
| WALL | TRANSPARENCY |
| . | . |
| . . | . . |
| . . . | . . . |

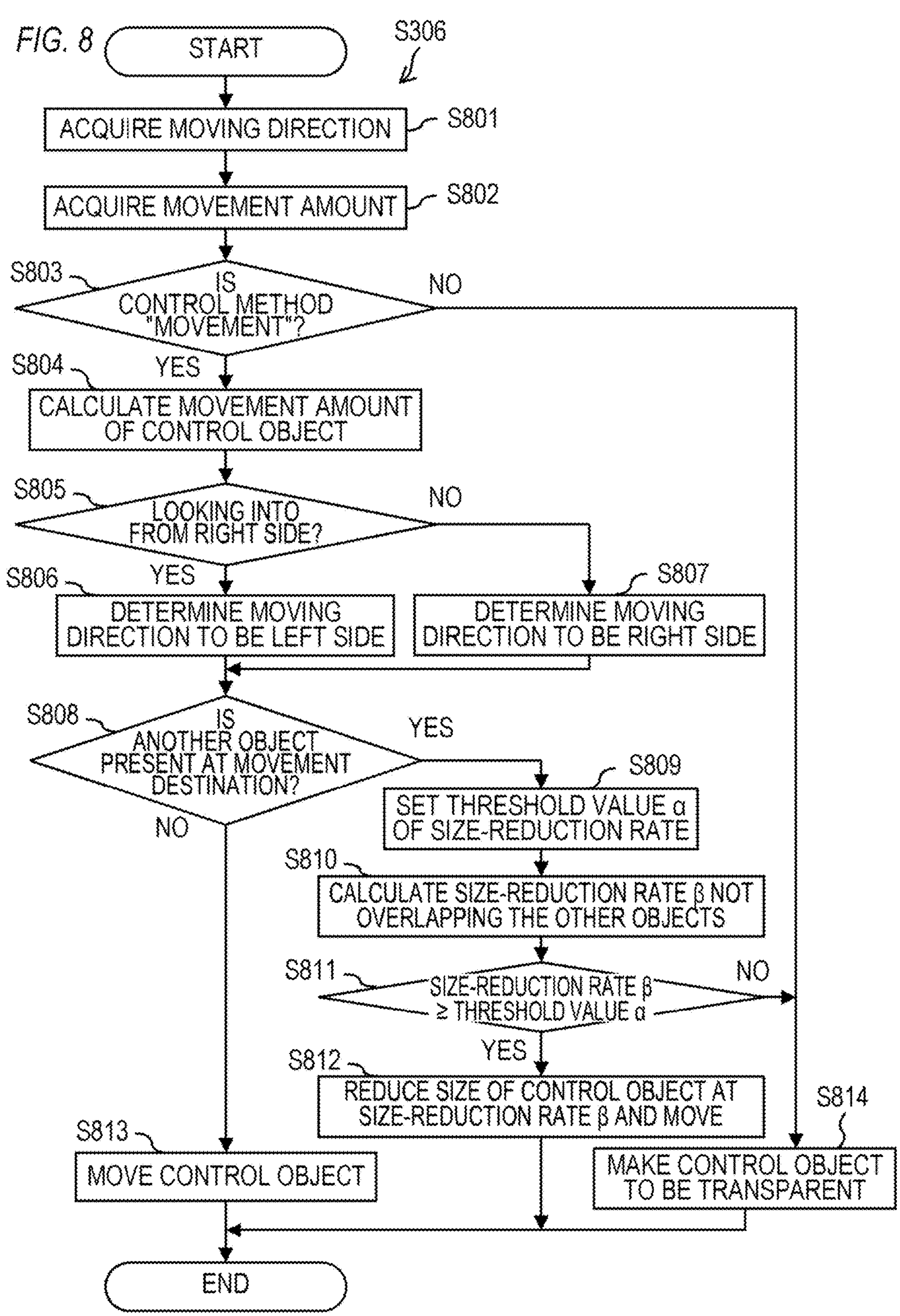
FIG. 8
START
S306
ACQUIRE MOVING DIRECTION
S801
ACQUIRE MOVEMENT AMOUNT
S802
S803
IS CONTROL METHOD "MOVEMENT"?
NO
S804
YES
CALCULATE MOVEMENT AMOUNT OF CONTROL OBJECT
S805
LOOKING INTO FROM RIGHT SIDE?
NO
S806
YES
DETERMINE MOVING DIRECTION TO BE LEFT SIDE
S807
DETERMINE MOVING DIRECTION TO BE RIGHT SIDE
S808
IS ANOTHER OBJECT PRESENT AT MOVEMENT DESTINATION?
YES
NO
S809
SET THRESHOLD VALUE α OF SIZE-REDUCTION RATE
S810
CALCULATE SIZE-REDUCTION RATE β NOT OVERLAPPING THE OTHER OBJECTS
S811
SIZE-REDUCTION RATE β ≥ THRESHOLD VALUE α
NO
YES
S812
REDUCE SIZE OF CONTROL OBJECT AT SIZE-REDUCTION RATE β AND MOVE
S814
MAKE CONTROL OBJECT TO BE TRANSPARENT
S813
MOVE CONTROL OBJECT
END

LEFT
RIGHT
900
902
901

LEFT
RIGHT
900
901

LEFT
RIGHT
900
901
902

LEFT
RIGHT
1002
1000
1001

LEFT
RIGHT
1002
1001
1000

LEFT
RIGHT
1002
1000
1001

LEFT
RIGHT
1002
1000
1001

INFORMATION PROCESSING DEVICE, HEAD MOUNTED DISPLAY, AND INFORMATION PROCESSING METHOD

BACKGROUND OF THE INVENTION

Field of the Invention

The present invention relates to an information processing device, a head-mounted information display, and an information processing method.

Description of the Related Art

Recently, an XR (Extended Reality) art which creates a new experience by fusing a real world and a virtual world has been known. The XR art is a collective name of arts of a virtual reality, a mixed reality, an augmented reality, and a substitutional reality.

The virtual reality (VR) art is an art which can enable a user to experience a virtual space as if it is a reality. The mixed reality (MR) art is an art which can enable a user to experience a mixed reality feeling by seamlessly merging the reality and the virtual reality. The augmented reality (AR) is an art which shows a reality space by overlapping a virtual world and by projecting it. The substitutional reality (SR) is an art which superposes a past image on the real world and projects it so as to be viewed.

As one of the XR art, there is an XR system which uses a head mounted display (HMD). The XR system can cause an XR space to be experienced by superposing and displaying a virtual object or the like on an actual outdoor scape and by presenting it to a user who wears an HMD.

The HMD has a function for detecting a line-of-sight position of the user and is capable of display control utilizing information of the line-of-sight position. In Japanese Patent Application Publication No. 2016-81339, for example, it is disclosed that a virtual object related to an actual object for which a watching operation was performed is displayed in accordance with continuation of the watching operation for a predetermined reference time. In Japanese Patent Application Publication No. 2016-82466, it is disclosed that an image visually recognized by a user changes depending on a combination of a direction of the head part of the user and the line-of-sight direction.

When a user who wears the HMD wants to visually recognize a rear of a virtual object temporarily, the user moves the virtual object by a user interface such as a hand gesture or actually moves to a position where the rear of the virtual object is seen. However, there are cases where confirmation of the rear of the virtual object is difficult, such as where a movement range is limited, control is desirably executed without changing a standing position, the hands and feet are not freely moved, or the like.

SUMMARY OF THE INVENTION

The present invention provides an information processing device which enables a user who wears a head mounted display to visually recognize a rear of a virtual object easily.

An information processing device according to the present invention includes a processor; and a memory storing a program which, when executed by the processor, causes the information processing device to: execute selecting processing to select a virtual object present at a line-of-sight position of a user wearing a head mounted display as a control object; execute determining processing to determine whether or not the user performed a predetermined operation for visually recognizing a rear of the control object; and execute control processing to execute control that the control object is moved and displayed such that the rear of the control object can be visually recognized in response to performance of the predetermined operation by the user, wherein in the control processing, a direction in which the control object is to be moved is determined based on at least either one of a moving direction and a rotating direction of a head part of the user, or a distance for which the control object is to be moved is determined based on at least either one of a movement amount and a rotation amount of the head part of the user.

Further features of the present invention will become apparent from the following description of exemplary embodiments with reference to the attached drawings.

BRIEF DESCRIPTION OF THE DRAWINGS

FIG. 2 is a block diagram illustrating a configuration example of the HMD;

FIG. 3 is a flowchart exemplifying processing of the HMD;

FIG. 4A is a view for explaining a 3-axis acceleration sensor;

FIG. 4B is a view for explaining a 3-axis angular velocity sensor;

FIG. 5 is a flowchart exemplifying determining processing of a looking-into operation;

FIG. 7 is a diagram for explaining metadata given to objects;

FIG. 8 is a flowchart exemplifying display control processing of a control object;

DESCRIPTION OF THE EMBODIMENTS

Embodiment

Hereinafter, with reference to the drawings, an Embodiment of the present invention will be explained.

Figure 1:
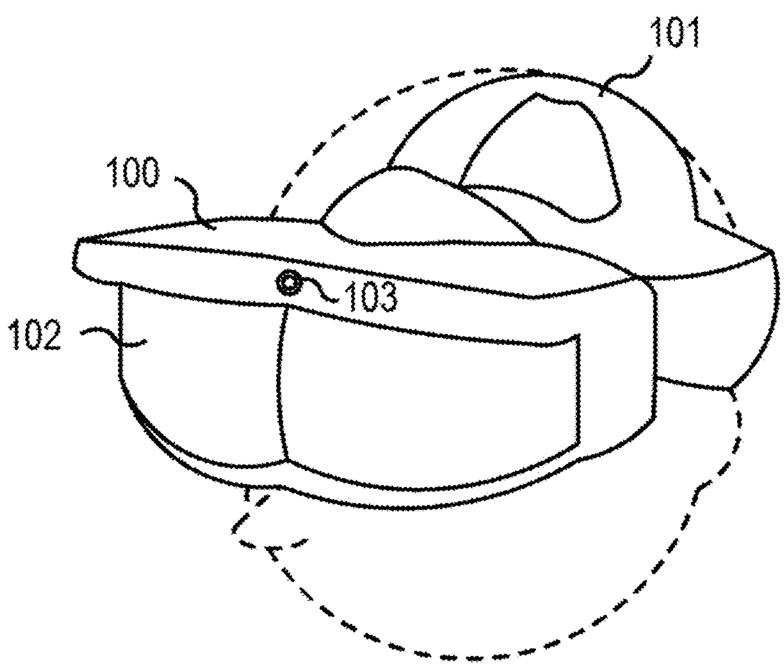
FIG. 1 is a view exemplifying an appearance of an HMD.

(Configuration of Device) By using FIG. 1 and FIG. 2, a configuration example of an HMD 100, which is a head mounted display according to this Embodiment will be explained. FIG. 1 is a view exemplifying an appearance of the HMD 100. The HMD 100 illustrated in FIG. 1 is a display device worn on the head part of a user. The HMD 100 includes a power switch and operation members such as buttons for controlling setting of the device. The user can operate the HMD 100 via the operation member, a controller capable of communication with the HMD 100 or the like. The HMD 100 has an image processing unit which performs generation of a virtual object, composition of images and the like.

A head-part wearing member 101 is a member for stably fixing the HMD 100 on the head of the user. The head-part wearing member 101 fixes the HMD 100 to the user's head so as to enable operation in accordance with movement of the head part of the user, without displacement of the HMD 100. Note that the head-part wearing member 101 is not limited to a member for fixing the HMD 100 to the head part of the user but may be a member which fixes the HMD 100 by hooking it by the user's ears.

A display device 102 displays a virtual object or a composed image of an image of a reality space and the virtual object before the eyes of the user, who is a wearer of the HMD 100. The display device 102 is a liquid crystal display or an organic EL (Electro Luminescence) display. The display device 102 includes a liquid crystal panel, a driver circuit which controls the liquid crystal panel, and a memory which holds an image to be displayed, for example. The display device 102 may be a non-transmission type display unit or may be an optical transmission type display unit capable of visual recognition of a reality space through a lens.

A photographing device 103 is a device (camera unit) which photographs an environment around the user. The photographing device 103 may photograph an environment in front of the user as an environment around the user. The front of the user can be a front surface of the head part of the user, for example.

FIG. 2 is a block diagram illustrating a configuration example of the HMD 100. The HMD 100 illustrated in FIG. 2 includes an image pickup unit 200, a line-of-sight detecting unit 201, a movement detecting unit 202, a rotation detecting unit 203, an information processing unit 204, an image processing unit 205, and a display unit 206. Note that the information processing unit 204 and the image processing unit 205 will be explained as a processing unit provided in the HMD 100, but processing or a part of the processing of the information processing unit 204 and the image processing unit 205 may be executed by an external information processing device capable of communication with the HMD 100. In this case, the information processing device executes processing of the information processing unit 204 and the image processing unit 205 and controls display of a virtual object displayed by the display unit 206 of the HMD 100.

The information processing unit 204 includes a picked-up image acquiring unit 207, an object holding unit 208, an object generating unit 209, a line-of-sight information acquiring unit 210, a movement-amount calculating unit 211, a rotation-amount calculating unit 212, an operation determining unit 213. The image processing unit 205 includes an object selecting unit 214, an object control unit 215, and a display-image generating unit 216.

The image pickup unit 200 has an optical system, an image sensor, and a driver circuit which controls the image sensor, an A/D conversion circuit which converts a signal acquired by the image sensor to a digital signal, and a development circuit which develops the acquired digital signal as an image. The image pickup unit 200 transmits image data which picked up an image (picked-up image) to the picked-up image acquiring unit 207 of the information processing unit 204. The picked-up image acquiring unit 207 transmits the image data received from the image pickup unit 200 to the display-image generating unit 216 of the image processing unit 205. Moreover, the picked-up image acquiring unit 207 transfers the picked-up image to the object generating unit 209.

The line-of-sight detecting unit 201 detects a line-of-sight direction of a user, who is a wearer of the HMD 100. The line-of-sight detecting unit 201 is a device used for a single-lens reflex camera or the like, for example, and may be a device which irradiates an eyeball of the user with an infrared light-emitting diode and detects a line-of-sight direction from a relationship between a reflected image by corneal reflection of a light source and a pupil.

The line-of-sight information acquiring unit 210 of the information processing unit 204 acquires information of a line of sight detected by the line-of-sight detecting unit 201 (hereinafter, described also as line-of-sight information). The line-of-sight information acquiring unit 210 transmits the acquired line-of-sight information to the object control unit 215.

The movement detecting unit 202 detects movement of the HMD 100. The movement detecting unit 202 can detect movement of the HMD 100 by using position information of a GPS (Global positioning system), an output of an acceleration sensor and the like, for example.

The movement-amount calculating unit 211 of the information processing unit 204 acquires information on the movement of the HMD 100 detected by the movement detecting unit 202 and calculates a moving direction and the movement amount of the HMD 100. The movement-amount calculating unit 211 transmits the calculated moving direction and movement amount of the HMD 100 (hereinafter, described also as movement information) to the operation determining unit 213.

The rotation detecting unit 203 detects rotation of the HMD 100. The rotation detecting unit 203 can detect the rotation of the HMD 100 by using an output of a rotation displacement sensor or the like, for example. The rotation-amount calculating unit 212 of the information processing unit 204 acquires the information on the rotation detected by the rotation detecting unit 203 and calculates a rotation direction and a rotation amount of the HMD 100 (hereinafter described also as rotation information). The rotation-amount calculating unit 212 transmits the calculated rotation direction and rotation amount of the HMD 100 to the operation determining unit 213.

The operation determining unit 213 determines an operation of the HMD 100 on the basis of the moving direction and the movement amount of the HMD 100 received from the movement-amount calculating unit 211 and the rotation direction and the rotation amount of the HMD 100 received from the rotation-amount calculating unit 212. The operation determining unit 213 transmits the determined information of on the operation (hereinafter, described also as operation information) to the object control unit 215 of the image processing unit 205.

The object holding unit 208 holds data related to a virtual space such as data (shape information, positional attitude information and the like) of a virtual substance (virtual object) constituting a virtual space, data of a light source emitted into the virtual space and the like in a storage unit such as a memory or the like. The object selecting unit 214 of the image processing unit 205 selects a virtual object to be displayed from the object holding unit 208 and transmits the data of the selected virtual object to the object control unit 215. Moreover, the object holding unit 208 may transmit data of the virtual object to the object generating unit 209 so as to generate the other virtual objects.

The object generating unit 209 generates a virtual object on the basis of the image data transmitted from the picked-up image acquiring unit 207 and the data of the virtual object transmitted from the object holding unit 208. The object generating unit 209 transmits the generated virtual object to the object selecting unit 214 of the image processing unit 205.

The object selecting unit 214 selects a virtual object to be displayed to the user from the object holding unit 208 and the object generating unit 209. The object selecting unit 214 transmits the data of the selected virtual object to be displayed to the object control unit 215. The data of the virtual object to be displayed, which is transmitted to the object control unit 215, includes display image data, disposition position data in a display angle of view, overlapping order data with the other virtual objects and the like.

The object control unit 215 controls display of a virtual object selected by the object selecting unit 214 on the basis of the line-of-sight information received from the line-of-sight information acquiring unit 210 and the operation information of the HMD 100 received from the operation determining unit 213. The control of display of the virtual object includes moving, size reduction, making transparent, and non-displaying of the virtual object. The object control unit 215 controls display of the virtual object by changing the data of the virtual object on the basis of the line-of-sight information and the operation information. The object control unit 215 transmits the data of the virtual object to which the display control was applied to the display-image generating unit 216.

The display-image generating unit 216 generates a composite image of the image data obtained by picking up an image of a reality space transferred from the picked-up image acquiring unit 207 and the virtual object received from the object control unit 215. The display-image generating unit 216 transmits the generated composite image to the display unit 206.

(Processing of HMD) By using FIG. 3, processing of the HMD 100 according to this Embodiment will be explained. FIG. 3 is a flowchart exemplifying the processing of the HMD 100. The processing shown in FIG. 3 is started when a user wearing the HMD 100 turns on a power-source switch of the HMD 100 and causes a virtual object to be displayed on the display device 102.

At Step S300, the line-of-sight information acquiring unit 210 acquires a line-of-sight position of the user in a display screen of the display device 102 on the basis of information of the line of sight of the user detected by the line-of-sight detecting unit 201. The line-of-sight information acquiring unit 210 transmits information of line-of-sight position of the user to the object control unit 215.

At Step S301, the object control unit 215 determines whether or not a virtual object is present at the line-of-sight position of the user on the basis of data of the virtual object selected by the object selecting unit 214 and the line-of-sight information received from the line-of-sight information acquiring unit 210. In a case where there is a virtual object at the line-of-sight position of the user, the processing proceeds to Step S302. In a case where there is no virtual object at the line-of-sight position of the user, the processing returns to Step S300.

Note that the object control unit 215 may determine whether or not the virtual object which is present at the line-of-sight position of the user is the virtual object displayed on a frontmost surface. In a case where the virtual object which is present at the line-of-sight position of the user is the virtual object on the frontmost surface, the processing proceeds to Step S302. In a case where the virtual object which is present at the line-of-sight position of the user is not the virtual object on the frontmost surface, the processing returns to Step S300.

At Step S302, the object control unit 215 selects the virtual object which is present at the line-of-sight position as a control object. At Step S303, the line-of-sight information acquiring unit 210 determines whether or not visual recognition time for the control object selected at Step S302 is longer than predetermined time t (time). That is, the line-of-sight information acquiring unit 210 determines whether or not the line-of-sight position directed toward the control object has changed during the predetermined time t. The predetermined time t can be time which can be determined such that the user is watching the control object, for example.

In a case where the visual recognition time for the control object is longer than the predetermined time t, the processing proceeds to Step S304. In a case where the visual recognition time for the control object is equal to or shorter than the predetermined time t, the processing returns to Step S300.

At Step S304, the operation determining unit 213 determines the operation of the HMD 100. The HMD 100 is fixed to the head part of the user, and the operation determining unit 213 can determine the operation of the head part of the user by determining the operation of the HMD 100. Specifically, the operation determining unit 213 acquires a moving direction and a movement amount of the HMD 100 (head part of the user) from the movement detecting unit 202. Moreover, the operation determining unit 213 acquires the rotating direction and the rotation amount of the HMD 100 (head part of the user) from the rotation detecting unit 203. The operation determining unit 213 determines the operation of the HMD 100 (user) on the basis of at least any one of the moving direction, the movement amount, the rotation direction, and the rotation amount of the HMD 100 (head part of the user). Note that the determining processing of the operation determining unit 213 at Step S304 may be executed before the processing at Step S303 is started.

At Step S305, the operation determining unit 213 determines whether or not a predetermined operation has been performed by the user. The predetermined operation is an operation for the user wearing the HMD 100 to visually recognize the rear of the control object selected at Step S302 and is an operation of actually looking into the rear of the control object, for example. Note that the predetermined operation is not limited to the looking-into operation but may be an operation determined in advance as an operation for visually recognizing the rear. For example, it may be such an operation to direct the face to a direction in which the control object is to be moved, while looking at the control object.

The operation determining unit 213 can determine whether or not the user has performed the predetermined operation on the basis of at least any one of the moving direction, the movement amount, the rotation direction, and the rotation amount of the HMD 100. The operation determining unit 213 can determine that the user has performed the predetermined operation, when the movement amount of the HMD 100 (head part of the user) is a distance within a predetermined range, for example. Moreover, the operation determining unit 213 can determine that the user has performed the predetermined operation, when the rotation amount of the HMD 100 (head part of the user) is an angle within a predetermined range. The operation determining unit 213 may determine that the user has performed the predetermined operation, when both conditions that the movement amount of the head part of the user is a distance within the predetermined range and the rotation amount is an angle within the predetermined range are satisfied.

Whether or not the movement amount of the head part of the user is a distance within a predetermined range can be determined by setting a first threshold value and a second threshold value (>first threshold value) determining the predetermined range and by determining whether or not the movement amount of the head part of the user is at least the first threshold value and not more than the second threshold value. Whether or not the rotation amount of the head part of the user is an angle within the predetermined range can be determined by setting a third threshold value and a fourth threshold value (>third threshold value) determining the predetermined range and by determining whether or not the rotation amount of the head part of the user is at least the third threshold value and not more than the fourth threshold value.

When the user performs the predetermined operation, the processing proceeds to Step S306. When the user has not performed the predetermined operation, the processing returns to Step S300.

At Step S306, the object control unit 215 controls display of the control object selected at Step S302 in response to the user's performance of the predetermined operation. The object control unit 215 controls the display of the control object so that the user can visually recognize the rear of the control object. The object control unit 215 controls the display of the control object by executing display control of at least any one of movement, size reduction, transparency, and non-displaying of the control object, for example.

The object control unit 215 transmits data of the control object, which is a control target of display, and data of the virtual object selected by the object selecting unit 214 to the display-image generating unit 216. The display-image generating unit 216 generates a composite image of the virtual object including the control object and the picked-up image and transmits the generated composite image to the display unit 206. The display unit 206 displays the composite image received from the display-image generating unit 216 on the display device 102.

At Step S307, the line-of-sight information acquiring unit 210 determines whether or not the line-of-sight position of the user has changed. The line-of-sight information acquiring unit 210 can determine that the line-of-sight position of the user has changed when a change amount from the line-of-sight position acquired at Step S300 is larger than the threshold value set in advance, for example. In a case where the line-of-sight position of the user has changed, the processing proceeds to Step S309. In a case where the line-of-sight position of the user has not changed, the processing proceeds to Step S308.

At Step S308, the operation determining unit 213 determines whether or not the predetermined operation by the user has finished. The operation determining unit 213 determines whether or not the predetermined operation has finished on the basis of the movement amount and the rotation amount from a positional attitude of the HMD 100 (positional attitude of the head part of the user) when it was determined that the predetermined operation was performed at Step S305, for example. When the movement amount is larger than a threshold value of the movement amount set in advance, when the rotation amount is larger than a threshold value of the rotation amount set in advance or both the movement amount and the rotation amount are larger than the respective threshold values, the operation determining unit 213 can determine that the predetermined operation has finished. In a case where the predetermined operation has finished, the processing proceeds to Step S309. In a case where the predetermined operation has not finished, the display control of the control object is not returned to the original, but the processing returns to Step S307.

At Step S309, the predetermined operation that the user wearing the HMD 100 actually looks into the control object has finished, and the object control unit 215 returns the control of the display performed at Step S306 to the original.

(Determination Example of Looking-into Operation) By using FIGS. 4A, 4B, FIG. 5, and FIGS. 6A to 6C, the determination example of the looking-into operation will be explained. The looking-into operation is an example of the predetermined operation. In the following example, the movement detecting unit 202 includes an accelerometer (3-axis acceleration sensor) which detects an acceleration in 3-axis directions, and the rotation detecting unit 203 includes an angular velocity meter (3-axis angular velocity sensor, gyro sensor) which detects an angular velocity in the 3-axis directions.

Figures 4A, 4B:
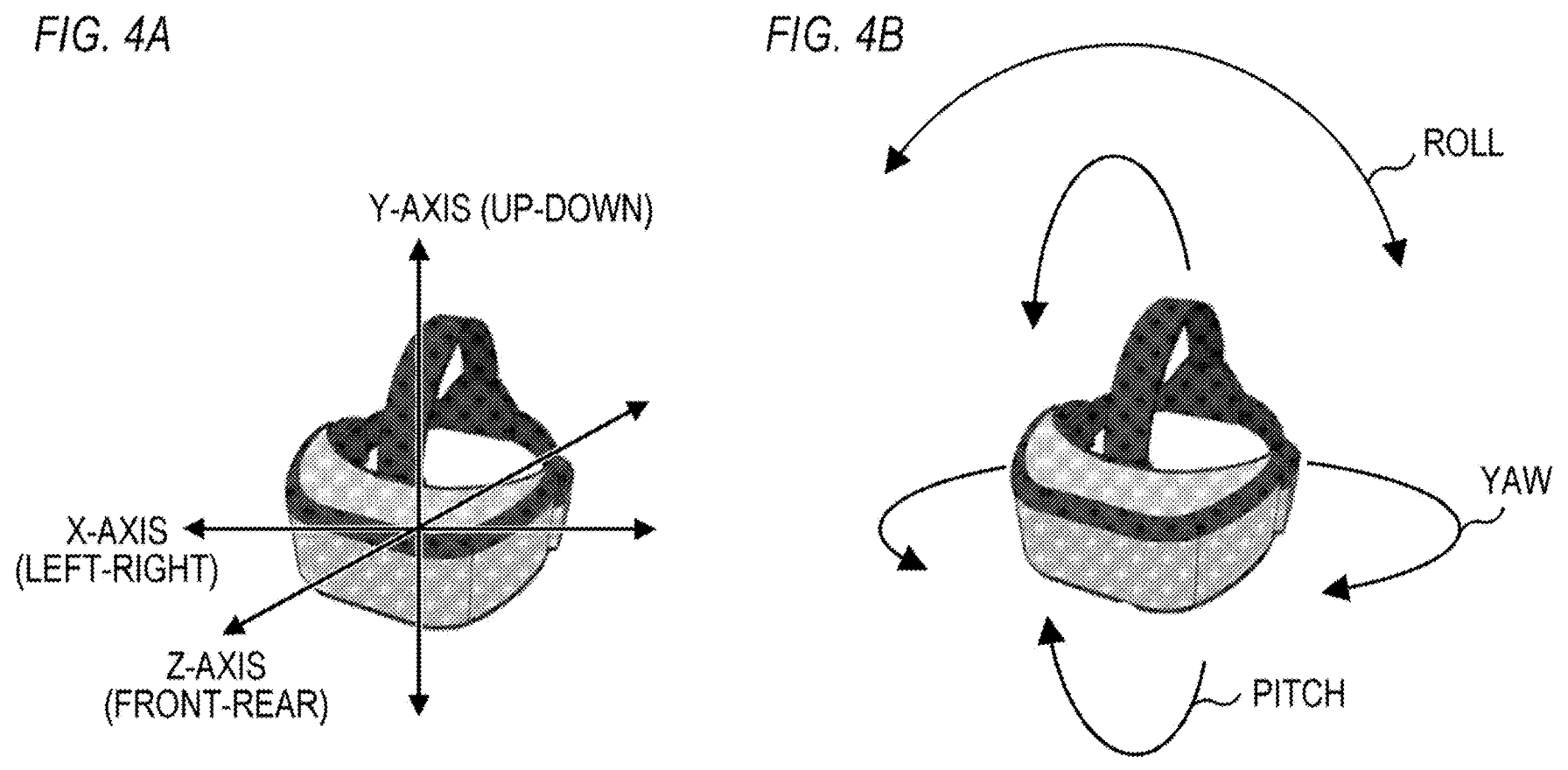

FIG. 4A is a diagram for explaining the 3-axis acceleration sensor. FIG. 4B is a diagram for explaining the 3-axis angular velocity sensor. The 3-axis acceleration sensor of the movement detecting unit 202 is mounted on the HMD 100 and detects an acceleration in the 3-axis directions of the HMD 100. As shown in FIG. 4A, the 3-axis acceleration sensor can detect moving directions in an X-axis (left-right), a Y-axis (up-down), and a Z-axis (front-rear) and the movement amount in each of the directions. An output of the 3-axis acceleration sensor is transmitted to the movement-amount calculating unit 211. The movement-amount calculating unit 211 can acquire the moving direction and the movement amount of the HMD 100 on the basis of the output data of the 3-axis acceleration sensor.

The 3-axis angular velocity sensor of the rotation detecting unit 203 is mounted on the HMD 100 and detects an angular velocity in the 3-axis directions of the HMD 100. As shown in FIG. 4B, the 3-axis angular velocity sensor can detect the rotating direction of a pitch (rotation with the left-right direction as an axis), a yaw (rotation with the up-down direction as an axis), and a roll (rotation with the front-rear direction as an axis) and the rotation amount in each of the directions. An output of the 3-axis angular velocity sensor is transmitted to the rotation-amount calculating unit 212. The rotation-amount calculating unit 212 can acquire the rotating direction and the rotation amount of the HMD 100 on the basis of the output data of the 3-axis angular velocity sensor.

Figures 6A, 6B, 6C:
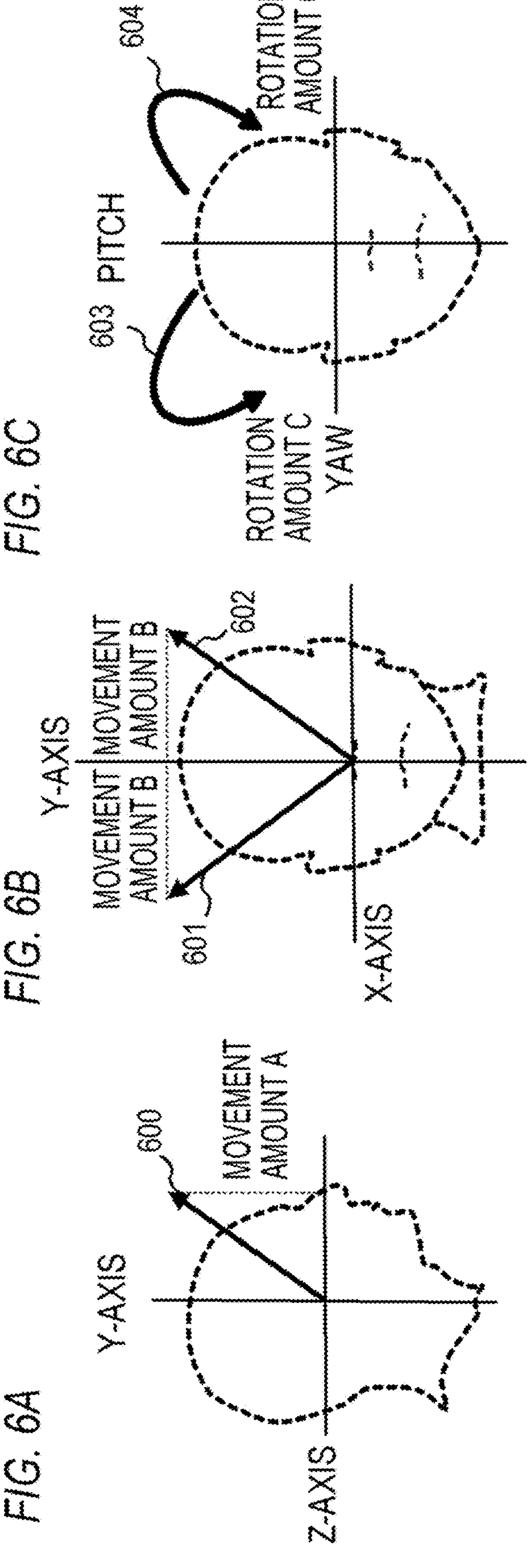
FIGS. 6A to 6C are diagrams for explaining determination of the looking-into operation.

FIG. 5 is a flowchart exemplifying determination processing of the looking-into operation. The processing shown in FIG. 5 is a specific example of the processing for determining whether or not the predetermined operations was performed at Step S304 and Step S305 in FIG. 3. FIGS. 6A to 6C are diagrams for explaining determination of the looking-into operation. In the following explanation, the 3-axis acceleration sensor and the 3-axis angular velocity sensor are described as an acceleration sensor and an angular velocity sensor, respectively.

At Step S500 in FIG. 5, the movement detecting unit 202 acquires an output of the acceleration sensor. The movement detecting unit 202 transmits the acquired output of the acceleration sensor to the movement-amount calculating unit 211. At Step S501, the movement-amount calculating unit 211 determines whether or not an initial value of the acceleration is held. The initial value of the acceleration is used for calculating the moving direction and the movement amount of the HMD 100.

In a case where the initial value of the acceleration is held, the processing proceeds to Step S503. In a case where the initial value of the acceleration is not held, the processing proceeds to Step S502. At Step S502, the movement-amount calculating unit 211 holds the output value of the acceleration sensor acquired at Step S500 as the initial value of the acceleration. The processing returns to Step S500.

At Step S503, the rotation detecting unit 203 acquires an output of the angular velocity sensor. The rotation detecting unit 203 transmits the acquired output of the angular velocity sensor to the rotation-amount calculating unit 212. At Step S504, the rotation-amount calculating unit 212 determines whether or not the initial value of the angular velocity is held. The initial value of the angular velocity is used for calculating the rotating direction and the rotation amount of the HMD 100.

In a case where the initial value of the angular velocity is held, the processing proceeds to Step S506. In a case where the initial value of the angular velocity is not held, the processing proceeds to Step S505. At Step S505, the rotation-amount calculating unit 212 holds the output value of the angular velocity sensor acquired at Step S503 as the initial value of the angular velocity. The processing returns to Step S504.

At Step S506, the movement-amount calculating unit 211 acquires the moving direction and the movement amount as movement information on the basis of a change amount from the initial value of the acceleration. Moreover, the rotation-amount calculating unit 212 acquires the rotating direction and the rotation amount as rotation information on the basis of the change amount from the initial value of the angular velocity.

At Step S507, the operation determining unit 213 determines whether or not the movement amount of the HMD 100 is a distance within the predetermined range. A threshold value of the distance determining the predetermined range only needs to be specified by an upper limit value and a lower limit value of the distance in the moving direction. Moreover, a threshold value of the distance determining the predetermined range may be provided in the up-down direction, the left-right direction, and the front-rear direction, respectively.

In the example in FIG. 6A, the threshold value of the movement amount in an upper front direction of the head part of the user is set to a movement amount A. Moreover, in the example in FIG. 6B, the threshold value of the movement amount in an upper left direction or an upper right direction of the head part of the user is set to a movement amount B. Regarding the movement amount acquired at Step S506, if the movement amount in the upper front direction is within a range from 0 to the movement amount A, and the movement amount in the upper left direction or the upper right direction is within a range from 0 to the movement amount B, the operation determining unit 213 can determine that the movement amount is a distance within the predetermined range. Note that the threshold value of the distance for determining the movement amount is not limited to the examples in FIGS. 6A and 6B but may be set in accordance with what operation the predetermined operation is. Moreover, the threshold value of the distance for determining the movement amount may be set for each user in accordance with characteristics of the user's movement.

At Step S507, if the movement amount of the HMD 100 is a distance within the predetermined range, the processing proceeds to Step S510. In a case where the movement amount of the HMD 100 is not a distance within the predetermined range, the processing proceeds to Step S508.

At Step S510, the operation determining unit 213 determines whether or not the rotation amount of the HMD 100 is an angle within a predetermined range. The threshold value of an angle determining the predetermined range is only necessary to be specified by an upper limit value and a lower limit value of the rotation angle.

In the example of FIG. 6C, the threshold values of the rotation amount of the head part of the user in the front left direction or the front right direction are set to a rotation amount C. Regarding the rotation amount acquired at Step S506, if the rotation amount in the front left direction or the front right direction is within a range from 0 to the rotation amount C, the operation determining unit 213 can determine that the rotation amount is an angle within the predetermined range. Note that the threshold value of the angle for determining the rotation amount is not limited to the example in FIG. 6C but may be set in accordance with a predetermined operation. Moreover, the threshold value of the angle for determining the rotation amount may be set for each user in accordance with characteristics of an action of the user.

At Step S510, if the rotation amount of the HMD 100 is an angle within the predetermined range, the processing proceeds to Step S511. In a case where the rotation amount of the HMD 100 is not an angle within the predetermined range, the processing proceeds to Step S508.

At Step S508, the rotation-amount calculating unit 212 updates the initial value of the angular velocity to an output value of the angular velocity sensor acquired at Step S503. At Step S509, the movement-amount calculating unit 211 updates the initial value of the acceleration to an output value of the acceleration sensor acquired at Step S500. When the initial value of the angular velocity and the initial value of the acceleration are updated, the processing returns to Step S500.

At Step S511, the operation determining unit 213 determines that the operation of the head part of the user is a looking-into operation. Note that, in the processing shown in FIG. 5, when both the movement amount and the rotation amount of the HMD 100 are within the respective predetermined ranges, the operation determining unit 213 determines that the looking-into operation was performed, but this is not limiting. The operation determining unit 213 may determine that the looking-into operation was performed, if the movement amount is a distance within the predetermined range, or may determine that the looking-into operation was performed, if the rotation amount is an angle within the predetermined range.

Moreover, in the processing shown in FIG. 5, the operation determining unit 213 determines whether or not the operation of the head part of the user is the looking-into operation by whether or not the movement amount and the rotation amount of the HMD 100 satisfy predetermined conditions, but the determination may be made by further using conditions related to the moving direction and the rotating direction. For example, if the movement amount is a distance within the predetermined range and the moving direction is front of the user, the operation determining unit 213 determines that it is the looking-into operation, while if the movement amount is a distance within the predetermined range and the moving direction is the rear of the user, the operation determining unit 213 determines that it is not the looking-into operation. Moreover, even if the rotation amount is the angle within the predetermined range, in a case where the rotating direction is a direction when the user faces the rear, the operation determining unit 213 may determine that it is not the looking-into operation.

Whether or not the predetermined operation including the looking-into operation was performed can be determined by comparing at least any one of the moving direction, the movement amount, the rotating direction, and the rotation amount with the threshold value set in advance for each of them. The threshold value of each of the moving direction, the movement amount, the rotating direction, and the rotation amount is set in accordance with a predetermined operation of a determination target.

(Metadata Indicating Display Control Method) By using FIG. 7, display control of the control object will be explained. To the control object, any one of control (display control) of movement, size reduction, transparency, and non-display is applied in response to the user's performance of the predetermined operation. A correspondence relation between the type of the object and the type of the display control to be applied can be determined in advance. The type of the object is a type set in accordance with whether it is movable or not, size can be reduced or not and the like, for example.

What display control is to be applied may be different depending on the type of the control object. When the display control which is different depending on the control object is to be applied, which display control of the movement, size reduction, transparency, and non-display is to be applied can be given as metadata to the data of each of the control objects. The control object is stored in the object holding unit 208 in correspondence with the metadata indicating which of the display control of the movement, size reduction, transparency, and non-display is to be applied in response to the user's performance of the predetermined operation. The object control unit 215 can control display of the control object on the basis of the metadata.

FIG. 7 is a diagram for explaining the metadata given to the object. There are cases where movement is assumed and where movement is not assumed depending on the type of the virtual object. Thus, when the virtual object has a method of display control as the metadata, the object control unit 215 can appropriately control display of the control object by referring to the metadata of the control object.

In the example in FIG. 7, a "doll" and a "car" of the objects can be moved also in reality spaces. Thus, the display control method of "movement" is given as the metadata to the "doll" and the "car" of the objects. The given metadata is associated with the data of the virtual object and is stored in the object holding unit 208.

The "building" and the "wall" of the objects are not assumed to move in the reality space and thus, if the "building" and the "wall" of the objects are moved, there is a possibility that a user feels strange. Therefore, the "building" and the "wall" of the objects are given the display control method of the processing method "transparency" as the metadata. The given metadata is associated with the data of the virtual object and is held in the object holding unit 208. Note that the display control method is not limited to the "movement" and the "transparency" shown in FIG. 7. The display control method only needs to be such control that the user can visually recognize the rear of the control object and may include control by the size reduction, rotation, non-display and the like.

(Display Control of Control Object) By using FIG. 8, FIGS. 9A to 9C, and FIGS. 10A to 10D, the display control of the control object will be explained. FIG. 8 is a flowchart exemplifying the display control processing of the control object. In the example shown in FIG. 8, the movement detecting unit 202 includes the 3-axis acceleration sensor, and the rotation detecting unit 203 includes the 3-axis angular velocity sensor.

The processing shown in FIG. 8 is an example of specific processing of the processing at Step S306 in FIG. 3. The HMD 100 executes processing similar to Steps S300 to S304 in FIG. 3, and at Step S305, determines whether or not the user has performed the looking-into operation as an example of the predetermined operation. The display control processing of the control object shown in FIG. 8 is executed when it is determined that the user has performed the looking-into operation.

At Step S801, the operation determining unit 213 acquires the moving direction of the HMD 100 (head part of the user) from the movement-amount calculating unit 211. The moving direction of the HMD 100 is used for controlling the display of the control object. The operation determining unit 213 transfers the acquired moving direction of the HMD 100 to the object control unit 215.

At Step S802, the operation determining unit 213 acquires the movement amount of the HMD 100 from the movement-amount calculating unit 211. The movement amount of the HMD 100 is used for controlling the display of the control object. The operation determining unit 213 transfers the acquired movement amount of the HMD 100 to the object control unit 215.

At Step S803, the object control unit 215 determines whether or not the control method, when the control object is displayed, is "movement". The object control unit 215 can acquire the control method, when the control object is displayed, from the metadata explained by using FIG. 7. When the control method of the display of the control object is the "movement", the processing proceeds to Step S804.

When the control method of the display of the control object is not the "movement", the processing proceeds to Step S814. At Step S814, the object control unit 215 controls so that the control object is made transparent, and the rear can be visually recognized. The object control unit 215 can make the control object transparent by raising transparency degree of the control object. The object control unit 215 only needs to set the transparency degree of the control object within a range that the user can visually recognize the rear. Note that, examples in which the control object is made transparent is shown in the examples in FIGS. 10A to 10D, but the control method of the control object may be control other than the transparency specified by the metadata.

At Step S804, the object control unit 215 calculates the movement amount of the control object. The object control unit 215 can determine a distance for which the control object is moved on the basis of at least either one of the movement amount and the rotation amount of the head part of the user, for example. The object control unit 215 may calculate the movement amount of the control object so that it is moved appropriately in accordance with a size of a display angle of view of the display device 102.

Figures 9A, 9B, 9C:
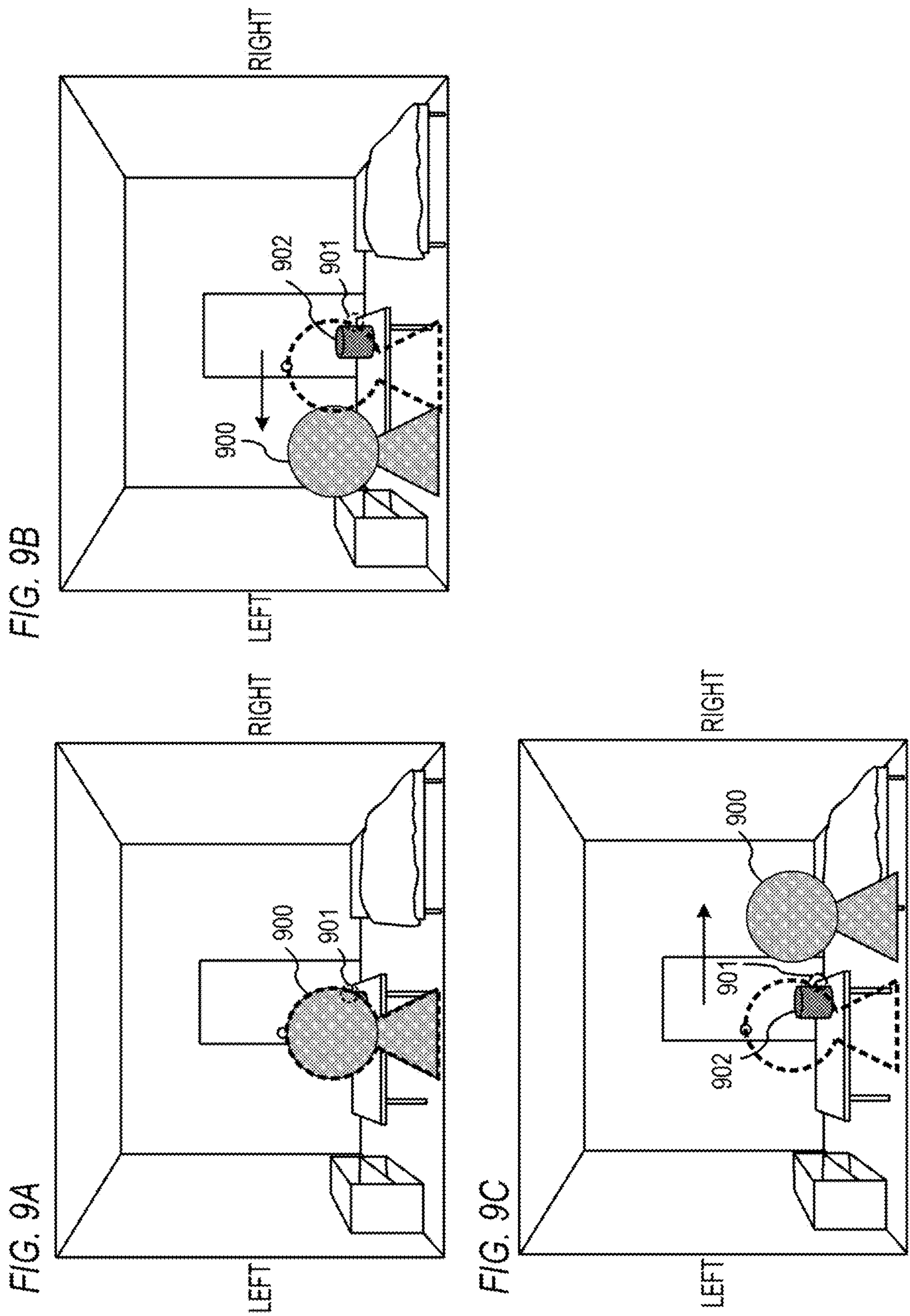
FIGS. 9A to 9C are diagrams for explaining a moving direction of the control object.

By using FIGS. 9A to 9C, determination on the moving direction of the control object at Steps S805 to S807 will be explained. FIGS. 9A to 9C are diagrams for explaining the moving direction of the control object. FIG. 9A illustrates a display example when a user wearing the HMD 100 is to visually recognize the rear (display on the rear surface) of a control object 900. FIG. 9A illustrates a state where the line of sight of the user is directed toward a line-of-sight position 901 for a period of time longer than the predetermined time t.

At Steps S805 to S807, the object control unit 215 determines the direction in which the control object 900 is to be moved on the basis of the moving direction of the HMD 100 acquired at Step S801. Note that, in the example in FIG. 8, the looking-into operation performed by the user is assumed to be either one of the operation of looking into from the right side and the operation of looking into from the left side.

At Step S805, the object control unit 215 determines whether or not the user wearing the HMD 100 performed the operation of looking into from the right side of the control object. In a case where the user performed the operation of looking into from the right side of the control object, the processing proceeds to Step S806. In a case where the operation of the user is not the operation of looking into from the right side, the processing proceeds to Step S807.

At Step S806, the object control unit 215 determines the moving direction of the control object to be the left side. When the moving direction of the control object is determined to be the left side, the object control unit 215 executes control such that, as shown in FIG. 9B, the control object 900 moves to the left side (direction indicated by an arrow). Since the control object 900 is moved to the left side, the user can visually recognize a virtual object 902 on the rear and the reality space.

At Step S807, it is assumed that the user wearing the HMD 100 performs a looking-into operation from the left side of the control object, and the object control unit 215 determines the moving direction of the control object to be the right side. When the moving direction of the control object is determined to be the right side, the object control unit 215 controls such that, as shown in FIG. 9C, the control object 900 is moved to the right side (direction indicated by an arrow). When the control object 900 is moved to the right side, the user can visually recognize the virtual object 902 on the rear and the reality space.

Note that, in the example at Steps S805 to S807, it was explained that the predetermined operation was the looking-into operation from the right side or the left side, but this is not limiting. For example, when the predetermined operation is the looking-into operation from an upper side, the object control unit 215 can determine the moving direction of the control object to be a lower side. When the predetermined operation is the looking-into operation from the lower side, the object control unit 215 can determine the moving direction of the control object to be the upper side.

Moreover, in the example at Steps S805 to S807, the moving direction of the control object is determined on the basis of the moving direction of the HMD 100, but it may be determined by considering the rotating direction of the HMD 100. By considering the rotating direction of the HMD 100, the object control unit 215 can detect from which direction the user is looking into the rear of the control object with accuracy. The object control unit 215 only needs to control such that the control object is moved to a side opposite to the direction in which the user is looking into the control object. As described above, the object control unit 215 can determine a direction in which the control object is to be moved on the basis of at least either one of the moving direction and the rotating direction of the HMD 100 (head part of the user).

By using FIGS. 10A to 10D, the display control of the control object at Steps S808 to S814 will be explained. FIGS. 10A to 10D are diagrams for explaining the display control of the control object. Specifically, when there is another virtual object in the direction in which the control object is to be moved, the object control unit 215 executes control of size reduction so that the control object does not overlap the other virtual objects.

Figures 10A, 10B, 10C, 10D:
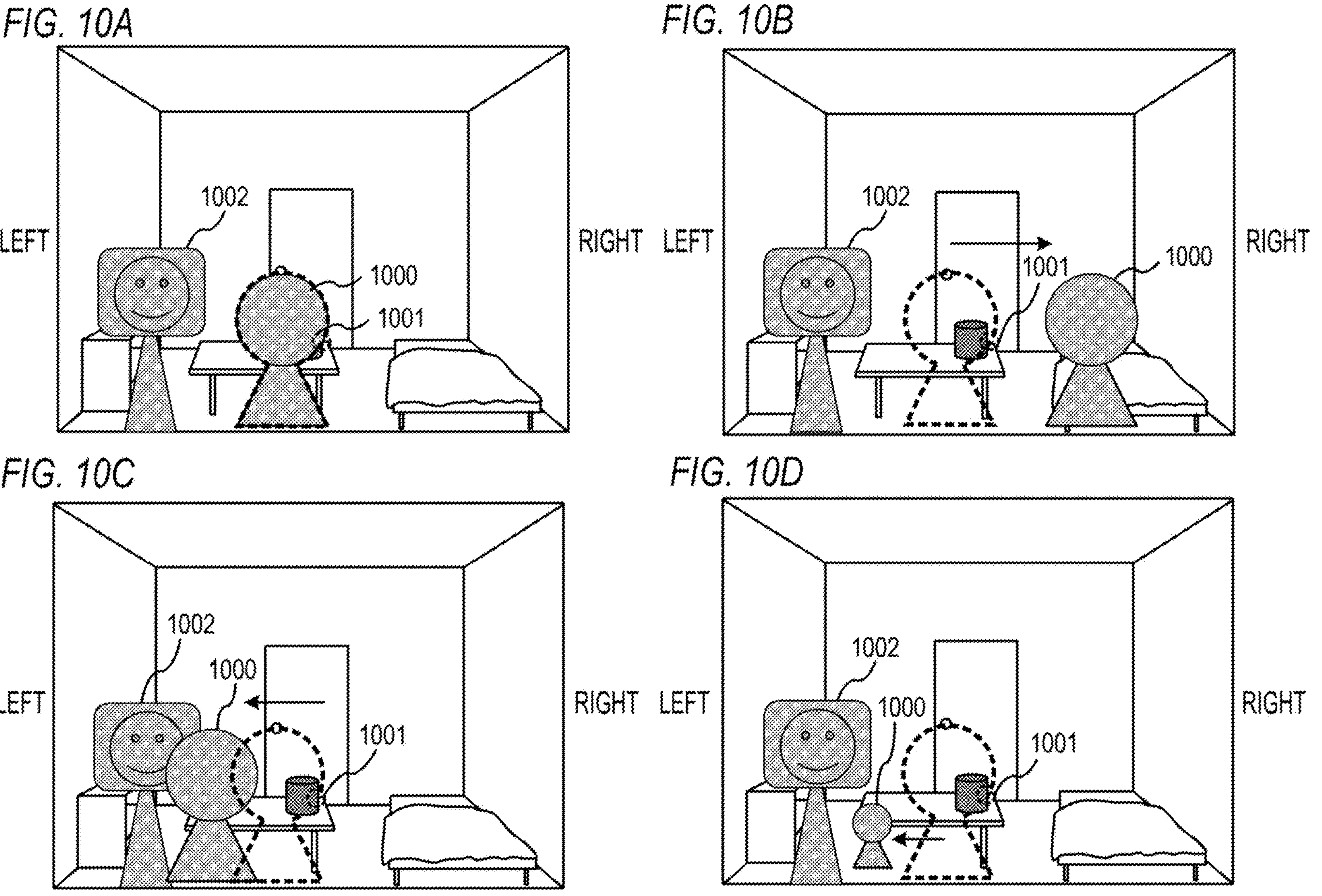
FIGS. 10A to 10D are diagrams for explaining display control of the control object.

FIG. 10A illustrates a display example of a case in which the user wearing the HMD 100 is to visually recognize the rear (display on the back surface) of a control object 1000. FIG. 10A illustrates a state where the line of sight of the user is directed to a line-of-sight position 1001 for a period of time longer than the predetermined time t. The HMD 100 displays another virtual object 1002, which is different from the control object 1000.

At Steps S808 to S814, the object control unit 215 controls display of the control object. The object control unit 215 changes a control method of the control object depending on whether or not there is another virtual object in a direction in which the control object is to be moved.

At Step S808, the object control unit 215 determines whether or not there is another virtual object in a direction in which the control object is to be moved. In a case where there is another virtual object in the moving direction, the processing proceeds to Step S809. In a case where there are no other virtual objects in the moving direction, the processing proceeds to Step S813.

At Step S813, since there are no other virtual objects in the direction in which the control object is to be moved, the object control unit 215 moves the control object on the basis of the movement amount calculated at Step S804. In the example in FIG. 10B, when the user wearing the HMD 100 performs the looking-into operation from the left side of the control object 1000, the control object 1000 is moved to the right side. Since there are no other virtual objects on the right side of the control object 1000, the control object 1000 does not overlap the other virtual objects such as the virtual object 1002 or the like even if it is moved.

Steps S809 to S812 are processing when there is another virtual object in the direction in which the control object is to be moved. The object control unit 215 reduces the size of the control object at the movement destination, if there is another virtual object in the direction in which the control object is to be moved. In the example in FIG. 10C, if the user wearing the HMD 100 performs the looking-into operation from the right side of the control object 1000, the control object 1000 moves to the left side and overlaps another virtual object 1002.

Thus, as shown in FIG. 10D, the object control unit 215 reduces the size of the control object 1000 so that it does not overlap another virtual object 1002 even if the control object 1000 is moved. However, so as not that visibility becomes worse due to the size reduction, in the example of the processing shown in FIG. 8, a threshold value for the size-reduction rate is set.

At Step S809, the object control unit 215 sets a threshold value $\alpha$ of the size-reduction rate (predetermined size-reduction rate). The threshold value $\alpha$ is set within such a range that the control object becomes visually recognizable on the basis of the type of the control object (whether or not it includes character of the like), a size of the display screen or the like, for example. At Step S810, the object control unit 215 calculates such a size-reduction rate R that the control object does not overlap another virtual object at the movement destination.

At Step S811, the object control unit 215 determines whether or not the size-reduction rate $\beta$ is equal to or larger than the threshold value $\alpha$. In a case where the size-reduction rate $\beta$ is equal to or larger than the threshold value $\alpha$, the control object does not overlap another virtual object by reducing the size at the size-reduction rate of the threshold value $\alpha$. In this case, the processing proceeds to Step S812. On the other hand, if the size-reduction rate $\beta$ is less than the threshold value $\alpha$, the control object overlaps another virtual object even if the size is reduced at the size-reduction rate of the threshold value $\alpha$. In this case, the processing proceeds to Step S814.

At Step S812, even if the size of the control object is reduced at the size-reduction rate $\beta$ at the movement destination, it can be visually recognized, and as shown in FIG. 10D, the object control unit 215 executes control such that the size of the control object 1000 is reduced and moved.

At Step S814, the size-reduction rate $\beta$ is smaller than the threshold value $\alpha$, and if the size of the control object is reduced at the size-reduction rate $\beta$, the visual recognition becomes difficult. That is, even if the size of the control object is reduced at the size-reduction rate of the threshold value $\alpha$ so that the control object becomes visually recognizable, the control object overlaps another virtual object. Therefore, the object control unit 215 executes such control that the control object is not moved but is made to be transparent so that the rear can be visually recognized.

At Steps S812 to S814, the object control unit 215 controls the display of the control object so that the user can visually recognize the rear of the control object.

The object control unit 215 transmits data of the virtual object selected by the object selecting unit 214, including data of the virtual object whose display was controlled, to the display-image generating unit 216. The display-image generating unit 216 generates a composite image in which the virtual object is superposed-displayed on the picked-up image. The display unit 206 displays the composite image generated by the display-image generating unit 216 on the display device 102.

When the control processing of the control object shown in FIG. 8 is finished, similarly to Steps S307 and S308 in FIG. 3, it is determined whether or not the line-of-sight position of the user has changed or the predetermined operation was finished. In a case where the line-of-sight position of the user has changed or the predetermined operation was finished, the object control unit 215 returns the control of the display of the control object executed at Steps S812 to S814 to the original, similarly to S309.

(Highlighted Display of Control Object) By using FIGS. 11A and 11B, highlighted display of the control object will be explained. The control object is a virtual object present at the line-of-sight position of the user, and the display is controlled by the performance of the predetermined operation by the user. The object control unit 215 can cause the virtual object, which is a control target, to be recognized by the user by performing highlighted display of the control object selected at Step S302 in FIG. 3.

Figures 11A, 11B:
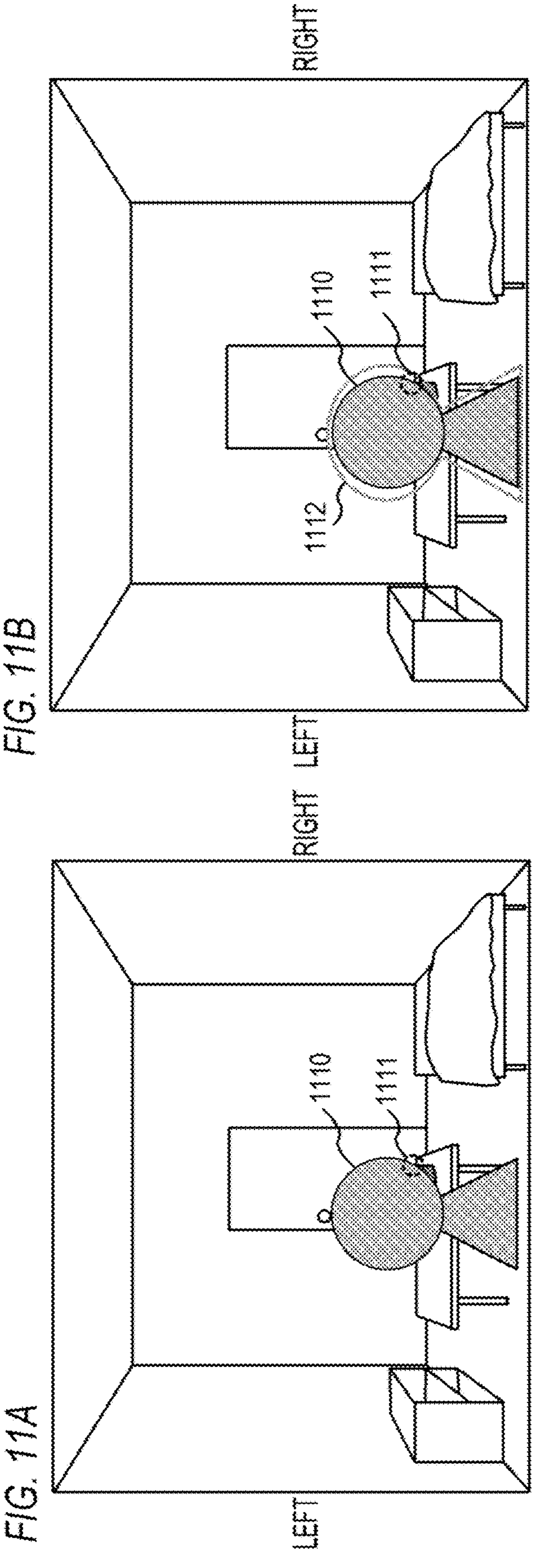
FIGS. 11A and 11B are diagrams for explaining highlighted display of the control object.

In FIG. 11A, if the line of sight of the user, who is a wearer of the HMD 100, is directed to a line-of-sight position 1111 for a period of time longer than the predetermined time t, the object control unit 215 executes control such that the control object 1110 is selected as a control target, and the highlighted display is performed. The object control unit 215 can perform highlighted display 1112 which causes an outline of the control object 1110 to be illuminated as shown in FIG. 11B, for example. Note that, a method of the highlighted display is not limited to illumination of the outline of the control object. The object control unit 215 only needs to control the display so that the user can recognize it easily, and may execute such control that the control object itself is caused to flash, for example.

The object control unit 215 may execute control such that the highlighted display of the control object is performed for a period since the control object was selected at Step S302 in FIG. 3 until the display control of the control object is started. Alternatively, the object control unit 215 may execute such control that the highlighted display of the control object is performed for a period since the control object was selected until the predetermined operation is finished.

According to the aforementioned Embodiment, the HMD 100 can make the rear of the virtual object to be visually recognizable by controlling the display of the virtual object present at the line-of-sight position of the user in response to the predetermined operation performed by the user. That is, the HMD 100 executes control such that the display of the virtual object is made different between before and after the performance of the predetermined operation so that the rear of the virtual object present at the line-of-sight position of the user himself/herself wearing the HMD 100 is made visually recognizable. The user can visually recognize the rear of the virtual object easily by performing the looking-into operation of the rear of the virtual object, for example, as a predetermined operation.

The aforementioned Embodiment is only an example, and configurations obtained by appropriately deforming or changing the configuration of the aforementioned Embodiment within the range of the gist of the present invention are also included in the present invention. Configurations obtained by appropriately combining the configuration of the aforementioned Embodiment are also included in the present invention.

Note that each function unit (FIG. 2) of the aforementioned Embodiment may be individual hardware or does not have to be such. The functions of two or more function units may be realized by common hardware. Each of the plurality of functions of one function unit may be realized by individual hardware. Two or more functions of one function unit may be realized by common hardware. Moreover, each of the function units may be realized by hardware or does not have to be such. For example, the device may have a processor and a memory in which the control program is stored. And the function of at least some of the function units provided in the device may be realized by the processor which reads out the control program out of the memory and executes it.

According to the present invention, a user wearing the head mounted display can visually recognize the rear of a virtual object easily.

Note that the above-described various types of control may be processing that is carried out by one piece of hardware (e.g., processor or circuit), or otherwise. Processing may be shared among a plurality of pieces of hardware (e.g., a plurality of processors, a plurality of circuits, or a combination of one or more processors and one or more circuits), thereby carrying out the control of the entire device.

Also, the above processor is a processor in the broad sense, and includes general-purpose processors and dedicated processors. Examples of general-purpose processors include a central processing unit (CPU), a micro processing unit (MPU), a digital signal processor (DSP), and so forth. Examples of dedicated processors include a graphics processing unit (GPU), an application-specific integrated circuit (ASIC), a programmable logic device (PLD), and so forth. Examples of PLDs include a field-programmable gate array (FPGA), a complex programmable logic device (CPLD), and so forth.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-142131, filed on Sep. 1, 2023, which is hereby incorporated by reference herein in its entirety.

What is claimed is:

1. An information processing device comprising:

a processor; and a memory storing a program which, when executed by the processor, causes the information processing device to:

(1) execute selecting processing to select, as a control object, a virtual object present at a line-of-sight position of a user wearing a head mounted display;

(2) execute first determining processing to determine whether or not the user performed a predetermined operation for visually recognizing a rear of the control object;

(3) execute second determining processing to determine that the predetermined operation has finished in a case where at least either one of a movement amount and a rotation amount of a head part of the user from a positional attitude of the head part of the user when it is determined that the predetermined operation has been performed is larger than a threshold value; and (4) execute control processing to execute control that the control object is moved and displayed such that a portion hidden by the control object can be visually recognized in response to determining in the first determining processing that the predetermined operation has been performed by the user, and to execute control that the control object is returned to an original position in response to determining in the second determining processing that the predetermined operation has finished, wherein in the control processing, (1) a direction in which the control object is to be moved is determined based on at least either one of a moving direction and a rotating direction of the head part of the user, or (2) a distance for which the control object is to be moved is determined based on at least either one of a movement amount and a rotation amount of the head part of the user.

2. The information processing device according to claim 1, wherein in the determining processing, whether or not the user performed the predetermined operation is determined based on at least any one of the moving direction, the movement amount, the rotating direction, and the rotation amount of the head part of the user.

3. The information processing device according to claim 2, wherein in the determining processing, it is determined that the user performed the predetermined operation in a case where the movement amount of the head part of the user is a distance within a predetermined range.

4. The information processing device according to claim 2, wherein in the determining processing, it is determined that the user performed the predetermined operation in a case where the rotation amount of the head part of the user is an angle within a predetermined range.

5. The information processing device according to claim 1, wherein in the control processing, at least any one of display control of movement, size reduction, transparency, and non-display to the control object is executed in response to performance of the predetermined operation by the user.

6. The information processing device according to claim 5, wherein in the control processing, in a case where there is another virtual object in the direction in which the control object is to be moved, control of size reduction is executed such that the control object does not overlap the another virtual object.

7. The information processing device according to claim 6, wherein in the control processing, in a case where the control object overlaps the another virtual object even if the size of the control object is reduced at a predetermined size-reduction rate, control is executed such that the control object is made transparent.

8. The information processing device according to claim 5, wherein a correspondence relation between a type of an object and a type of the display control is set in advance, and wherein in the control processing, display control corresponding to a type of the control object in the movement, the size reduction, the transparency, and the non-display is executed to the control object.

9. The information processing device according to claim 1, wherein in the control processing, control is executed such that highlighted display of the control object selected in the selecting processing is executed.

10. The information processing device according to claim 9, wherein in the control processing, control is executed such that the highlighted display of the control object is performed for a period since the control object was selected in the selecting processing until display control of the control object is started or the predetermined operation is finished.

11. A head mounted display comprising:

the information processing device according to claim 1; and a display which displays an image in which display of the control object is controlled.

12. An information processing method comprising:

a selecting step of selecting, as a control object, a virtual object present at a line-of-sight position of a user wearing a head mounted display;

a first determining step of determining whether or not the user performed a predetermined operation for visually recognizing a rear of the control object;

a second determining step of determining that the predetermined operation has finished in a case where at least either one of a movement amount and a rotation amount of a head part of the user from a positional attitude of the head part of the user when it is determined that the predetermined operation has been performed is larger than a threshold value; and a control step of executing control that the control object is moved and displayed such that a portion hidden by the control object can be visually recognized in response to determining in the first determining step that the predetermined operation has been performed by the user, and executing control that the control object is returned to an original position in response to determining in the second determining step that the predetermined operation has finished, wherein in the control step, (1) a direction in which the control object is to be moved is determined based on at least either one of a moving direction and a rotating direction of the head part of the user, or (2) a distance for which the control object is to be moved is determined based on at least either one of a movement amount and a rotation amount of the head part of the user.

13. A non-transitory computer-readable medium storing a program that causes a computer to execute an information processing method, the information processing method comprising:

a selecting step of selecting, as a control object, a virtual object present at a line-of-sight position of a user wearing a head mounted display;

a first determining step of determining whether or not the user performed a predetermined operation for visually recognizing a rear of the control object;

a second determining step of determining that the predetermined operation has finished in a case where at least either one of a movement amount and a rotation amount of a head part of the user from a positional attitude of the head part of the user when it is determined that the predetermined operation has been performed is larger than a threshold value; and a control step of executing control that the control object is moved and displayed such that a portion hidden by the control object can be visually recognized in response to determining in the first determining step that the predetermined operation has been performed by the user, and executing control that the control object is returned to an original position in response to determining in the second determining step that the predetermined operation has finished, wherein in the control step, (1) a direction in which the control object is to be moved is determined based on at least either one of a moving direction and a rotating direction of the head part of the user, or (2) a distance for which the control object is to be moved is determined based on at least either one of a movement amount and a rotation amount of the head part of the user.

14. The information processing device according to claim 1, wherein the control object is stored in correspondence with metadata indicating display control to be applied to the control object in response to the predetermined operation, and wherein in the control processing, at least any one of display control of movement, size reduction, transparency, and non-display to the control object is executed based on the metadata, in response to performance of the predetermined operation by the user.

15. The information processing device according to claim 1, wherein the program, when executed by the processor, further causes the information processing device to execute storing processing to store the positional attitude of the head part of the user when it is determined that the predetermined operation has been performed.

16. The information processing device according to claim 1, wherein in the control processing:

when the user performs, as the predetermined operation, an operation of looking into from a right side of the control object, the control object is moved to a left side, and when the user performs, as the predetermined operation, an operation of looking into from the left side of the control object, the control object is moved to the right side.

* * * * *